INVENTORS
ROBERT E. BRINDLEY
WILLIAM H. DORING

*John F Hohmann*
ATTORNEY

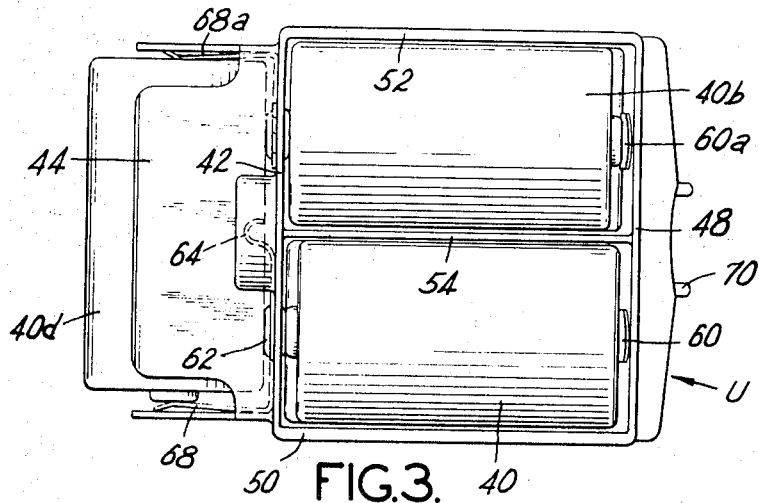
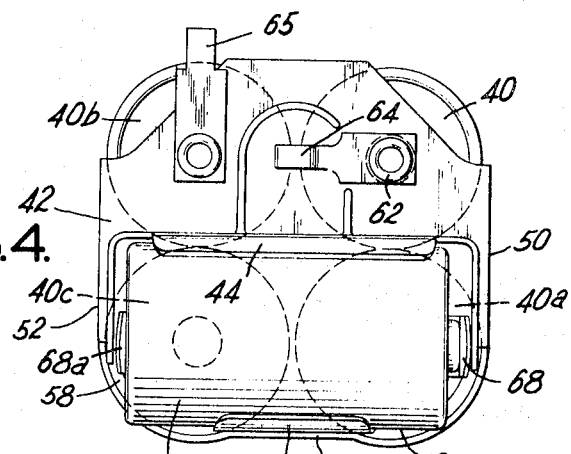
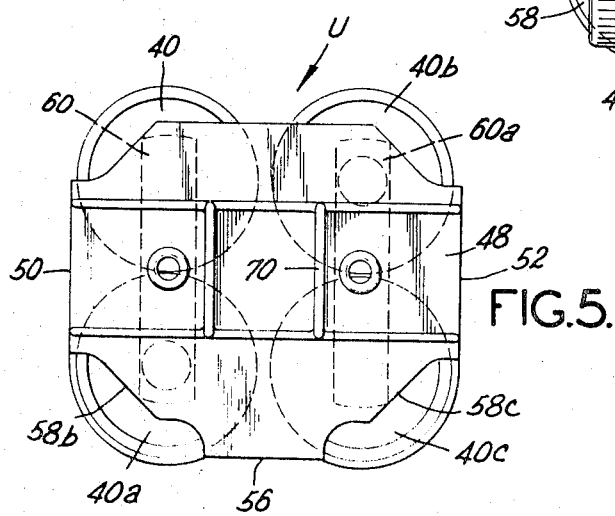

United States Patent Office 3,563,807
Patented Feb. 16, 1971

3,563,807
BATTERY HOLDER UNIT FOR PORTABLE ELECTRIC HAND LANTERN
Robert E. Brindley, New York, N.Y., and William H. Doring, Old Greenwich, Conn., assignors to Union Carbide Corporation, New York, N.Y., a corporation of New York
Original application June 22, 1967, Ser. No. 648,059, now Patent No. 3,456,102, dated July 15, 1969. Divided and this application Feb. 10, 1969, Ser. No. 822,773
Int. Cl. H01m 1/04
U.S. Cl. 136—173           1 Claim

ABSTRACT OF THE DISCLOSURE

A portable hand lantern having a lamp and reflector assembly mounted on a housing generally rectangular in section with a cantilevered handle is powered by a number (e.g. five) of individual dry cells removably held in a removable battery unit in which pairs of cells are mounted with axes parallel to each other and an odd cell is mounted crosswise to the others, all cells being electrically connected in series.

---

Figure 1:
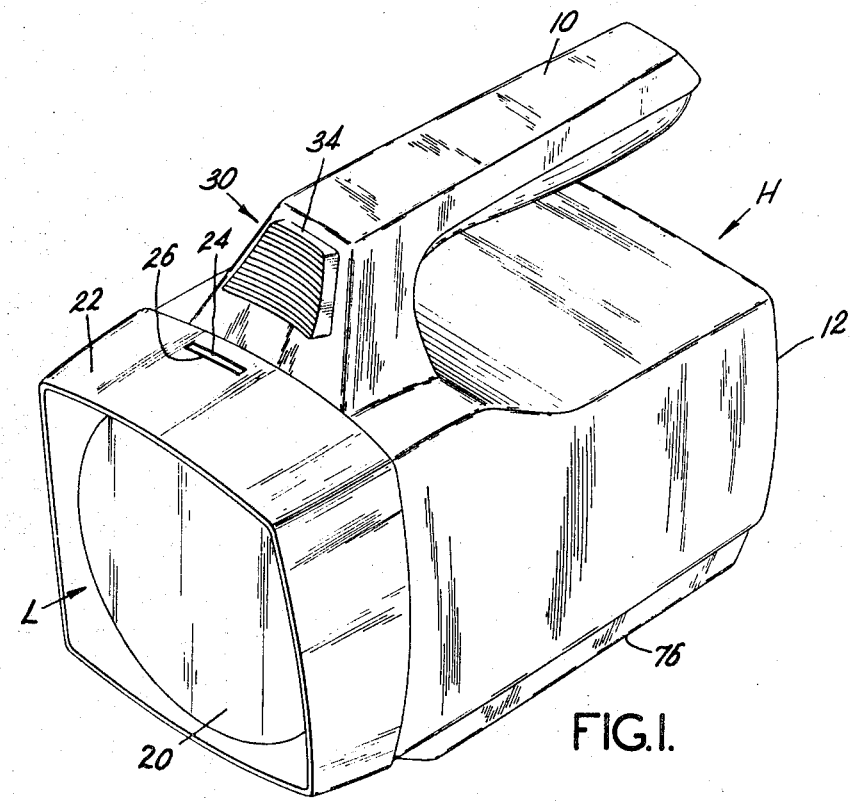

This is a division of application Ser. No. 648,059, filed June 22, 1967, now Pat. No. 3,456,102.

This invention relates to a portable electric hand lantern and to a battery unit for use in such a device.

Despite the fact that the portable hand lighting device known generally as the "flashlight" is one of the most widely used tools of industry, mechanic and householder, and despite the fact that flashlights are available on the market in seemingly endless variety of size, shape, and power, there is still demand for improvement in brilliance of light, convenience, portability and economy. In the traditional cylindrical flashlight of commerce in which cells are arranged end-to-end in electrical series in a casing, it is simple to increase light by providing a longer casing and adding cells. But five-cell and six-cell lights of this type are somewhat awkward, are heavy, and are not always convenient to carry or use for the ordinary situations.

Consequently the most popular cylindrical flashlight where light may be needed temporarily usually contains but two cells, and although improvement in cells, reflectors and lamps has provided greater brilliance than formerly, obviously, a two-cell flashlight is not as "bright" as one containing more than two cells. The cylindrical shape also makes direction of the light to the desired location difficult unless the device is hand held, and, of course, this eliminates one hand of the user from holding anything else.

Another type of flashlight of more recent introduction is the so-called "lantern" type which is usually of larger size, may be generally rectangular in cross-section, may have a larger reflector than cylindrical flashlights and has a special "lantern-type" battery usually of four cells interconnected in series available as and replaceable as a unit. The lntern type light most popular can be placed upon a flat support for aiming a "straight ahead" beam of light. A disadvantage is that its special battery is not available everywhere and must be handled always as a unit.

Furthermore, the conventional lantern battery is usually of only four cells, hence does not produce the brilliant light of a five-cell cylindrical flashlight, and because it is assembled of a number of parts is somewhat more expensive than individual cells purchased separately.

Other types of lanterns include those which are simply a lamp assembly and handle adapted to fit onto batteries of various types and sizes. These are best suited to heavy duty uses, generally are much heavier than an ordinary flashlight, and, again, require batteries not as readily available as the unit dry cell which can be purchased in almost any type of store.

Thus, there is a demand for a portable electric hand lantern that will produce a more brilliant illumination than the types now available using the conventional unit dry cell of commerce.

It is the principal object of this invention to satisfy this demand. More specifically, it is an object of the invention to provide a compact, well-balanced portable electric hand lantern powered by a plurality, preferably five, of individual cells individually replaceable, which lantern can be placed in a number of positions without hand support by the user. Another object of the invention is a battery holder for use in such a lantern which makes possible the introduction and removal from the lantern of the individual cells as a unit.

The invention by means of which these objects are achieved comprises a lantern having a housing, preferably generally rectangular in cross section, having a cantilevered handle; a lamp assembly comprising lamp, lamp holder, reflector, lens and lens ring removably mounted on one end of the housing; a battery unit within the housing accommodating a plurality of individual unit dry cells electrically connected; a switch; and flexible conductors connecting one side of the switch to the lamp and the other side thereof to the battery unit. The invention also includes the battery unit adapted for use in the lantern.

Figure 2:
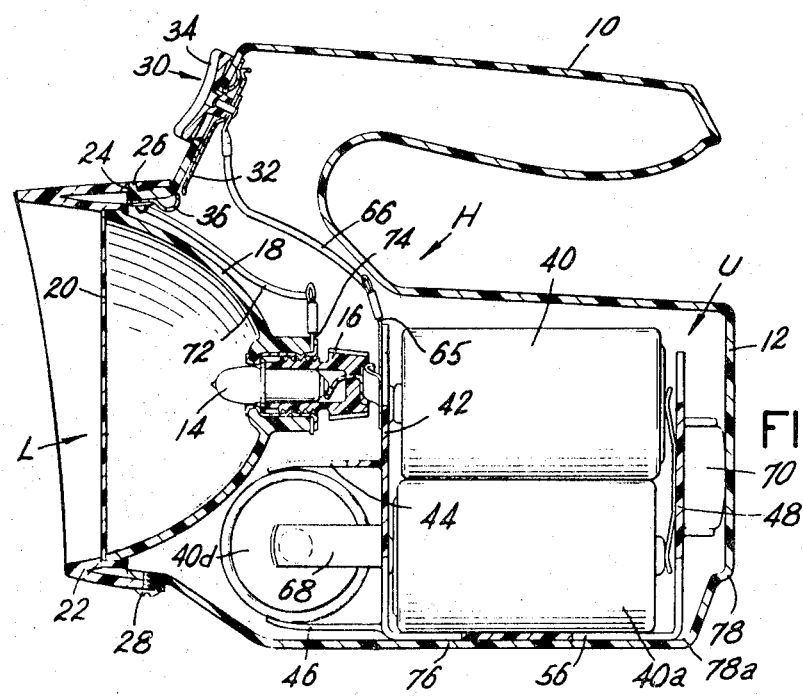

In the drawing:
FIG. 1 is an isometric view of a hand lantern embodying the invention;
FIG. 2 is a vertical section of the lantern of FIG. 1;
FIG. 3 is a top view of a battery unit embodying the invention for use in the lantern of FIGS. 1 and 2;
FIG. 4 is a front view thereof; and
FIG. 5 is a rear view thereof.

Referring now to FIGS. 1 and 2, it will be seen that the hand lantern there illustrated has a hollow generally rectangular in section housing H with an integral hollow cantilevered handle 10 extending from one end thereof to the opposite end 12 which is the rear wall of the housing H. Detachably mounted on the front end of the housing H is a lamp assembly L comprising a lamp 14, a lamp holder 16, a reflector 18, a lens 20 and a lens ring 22. The assembly L is secured to the housing H by a tenon 24 provided on the upper edge of the housing H fitting a mortise 26 provided in the lens ring 22 and at the bottom by a screw 28. Mounted on the handle 10 is a switch 30 having a movable member 32 which is secured to a button 34 and is adapted to make contact with a fixed member 36 when the button 34 is slidably moved.

Mounted within the housing H is a battery unit U shown in detail in FIGS. 3, 4 and 5 and holding a plurality of dry cells 40, 40a, 40b, 40c and 40d. As shown, four of the five dry cells 40, 40a, 40b, 40c are mounted in stacked pairs and the fifth, 40d, is mounted at the front wall 42 of the battery unit U crosswise of the stacked pairs and is maintained in position there by fingers 44, 46 projecting from the front wall 42.

The framework of the battery unit U includes in addition to the front wall 42 a rear wall 48, side walls 50, 52 and a central partition 54 parallel to the side walls 50, 52 and separating the stacked pairs of cells 40, 40a, 40b, 40c and a bottom 56. Cut out portions of the front wall 42, rear wall 48 and bottom 56 provide apertures 58, 58a, 58b, 58c for access to the lower cells 40a, 40c in the stacked pairs. Mounted on the rear wall 48 of the unit U are electrically conductive resilient contact strips 60, 60a adapted to make contact with each of the cells in the stacked pairs. Mounted on the front wall 42 above the projecting finger 44 is a contact member 62 having a projection 64, the element 62 making contact with the upper cell of one of the stacked pairs of cells and the projection 64 being adapted to make electrical contact with the lamp 14 through the lamp holder 16. A second contact element 65 is mounted on the front wall 42 above the finger 44 making contact with the other upper cell of stacked pairs and through a flexible conductor 66 with the movable element 32 of the switch 30. Mounted on the front wall 42 of the unit U between the projecting fingers 44, 46 is a pair of contact elements 68, 68a making contact with the crosswise mounted cell 40d and the two lower cells 40a, 40c of the stacked pairs of cells. Thus, it will be seen that the five cells are interconnected to each other and to contact elements for the lamp 14 and the switch 30. A boss 70 projecting rearwardly from the rear wall 48 of the unit U is adapted to engage the rear wall 12 of the housing H when the unit U is inserted therein and to maintain firm contact between the lamp contacting projection 64 of the contact element 62 when the lamp assembly L is secured to the housing H. A flexible conductor 72 connects the lamp 14 through a conducting flange 74 secured to the reflector 18 to the fixed element 36 of the switch 30.

It will be seen in FIGS. 1 and 2 that the housing H has a generally flat-bottomed base 76 of lesser length than the housing H and that the unit U rests within the base 76. Also it will be seen that the rear portion of the reflector 18 and the lamp holder 16 as well as the flexible conductors 66 and 72 are accommodated in the space above the projecting finger 44 of the unit U.

The provision of the base 76 makes possible standing the lantern on a generally flat horizontal surface at an acute angle by resting the lantern on the edges 78, 78a of the rear wall 12 and base 76. The generally flat rear wall of the housing H also makes possible the placement of the lantern on a generally flat surface in a vertical position, the handle 10 helping to support the lantern in that position.

As indicated, the housing H and the handle 10 are of one piece. The unit may conveniently be manufactured by blow molding from a blow moldable resin such as polyethylene or polypropylene or other conventional material. The battery unit U may also be conveniently manufactured in one molding operation from conventional thermoplastic molding resin. The use of thermoplastic materials contributes to economy and lightness in weight.

It will be appreciated from the foregoing description that the invention provides a five-cell lantern in which each individual cell may be replaced as necessary. Since the cells used are those which are obtainable in food stores, drugstores, hardware stores, service stations and literally almost any retail establishment, the invention provides a lantern having the advantages of brilliant illumination, ready portability and convenient shape without the necessity for obtaining special batteries. It will be evident too that the battery unit of the invention provides a convenient power source for any electrically-powered device of relatively low voltage.

What is claimed is:
1. A battery unit comprising:
 (a) a framework of electrically insulating material having vertical side and end walls;
 (b) a plurality of individual dry cells arranged in stacked pairs in said framework out of physical contact with each other;
 (c) a pair of spaced apart finger members protruding outwardly from and extending across one of said end walls, said framework and said pair of fingers being integrally formed;
 (d) an odd dry cell having electrical terminals at each end thereof, said dry cell being secured between said pair of finger members with said electrical terminals exposed at each end thereof;
 (e) said battery unit having at least one support surface for each cell arranged in said framework in stacked pairs but having apertures for physical access thereto;
 (f) electrically conductive resilient contact means secured to said framework to connect said stacked pairs of cells electrically in series relationship and including a pair of contact members extending outwardly from said end wall and between said pair of finger members, said pair of contact members making electrical contact with said electrical terminals at each end of said odd cell and electrically connecting said odd cell in series with said stacked pairs of cells in said framework;
 (g) said pair of finger members and contact members cooperating to secure said odd cell in place at said end wall and to prohibit its movement in any direction; and
 (h) a second pair of contact members on said framework for connecting said battery to the device to be powered thereby.

References Cited
UNITED STATES PATENTS

| | | | |
|---|---|---|---|
| 1,487,428 | 3/1924 | Balderston | 136—173.11 |
| 1,487,430 | 3/1924 | Balderston | 136—173.11 |
| 2,216,666 | 10/1940 | Hempel | 136—173.12 |
| 2,308,270 | 1/1943 | Cubert | 136—173.12 |

DONALD L. WALTON, Primary Examiner

U.S. Cl. X.R.

136—135